United States Patent [19]

Schneider

[11] Patent Number: 4,621,879

[45] Date of Patent: Nov. 11, 1986

[54] BOX-LIKE FURNITURE STRUCTURE

[75] Inventor: Walter Schneider, Langnau, Switzerland

[73] Assignee: W. Schneider & Co. AG Metallwarenfabrik, Langnau, Switzerland

[21] Appl. No.: 626,710

[22] Filed: Jul. 2, 1984

[30] Foreign Application Priority Data

Jul. 5, 1983 [CH] Switzerland .................. 3686/83

[51] Int. Cl.⁴ .............................................. A47B 47/03
[52] U.S. Cl. .................................... 312/258; 312/140; 403/205; 403/403
[58] Field of Search ............... 312/111, 140, 257 R, 312/257 SK, 258, 263; 403/403, 205, 231

[56] References Cited

U.S. PATENT DOCUMENTS

| 2,155,128 | 4/1939 | Gray | 312/204 |
| 2,475,513 | 7/1949 | Peckinpaugh | 312/258 |
| 2,969,268 | 1/1961 | Mason et al. | 312/140 |
| 3,323,819 | 6/1967 | Barker | 403/403 |
| 3,606,506 | 9/1971 | Ungaro | 312/111 |

Primary Examiner—William E. Lyddane
Assistant Examiner—Joseph Falk
Attorney, Agent, or Firm—Frishauf, Holtz, Goodman & Woodward

[57] ABSTRACT

One corner connecting element (5), in the form of a rail, is present at each corner of a box-like structure having four side walls (3) and one bottom or rear wall (2). With longitudinal grooves (8), the rail engages bent-over edge portions (13) of the walls of the structure. The corner connecting elements (5) are preferably realized in two parts (6,7) in the longitudinal direction, the parts being held together by screws (12). Since the outside of the connecting rail (5) is embodied in the shape of one-quarter of a circle, the corners of the structure are rounded. The fabrication of such structures, such as bathroom cabinets and the like, is simplified as a result, because welded connections can be dispensed with.

20 Claims, 10 Drawing Figures

BOX-LIKE FURNITURE STRUCTURE

The present invention relates to a box-like furniture structure, such as a wardrobe, cabinet and the like, and for example to a bathroom cabinet, and more particularly to a structure having metal or plastic side walls which are to be joined together without requiring welding, seaming or adhesion of side wall panels to form the box or cabinet structure.

BACKGROUND

Conventional box-like structures made of metal or plastic panels are fabricated in such a manner that the side walls and generally the bottom as well are joined by welded seams or spot welding. Precise joining occasions a certain amount of effort, and in addition, finishing work must often be performed at the welded locations.

Corner connecting rails are already known, which have two grooves extending at right angles to one another, into which flat sheets or panels can be inserted. However, frame-like cross struts or the like are required to secure the position of the connecting rails and of the sheets or panels relative to one another.

THE INVENTION

It is an object to devise a box-like furniture structure, intended in particular for bathrooms, which is made of sheet material, particularly sheet metal, although plastic may also be used, in which the bottom and side walls can be joined in a non-shifting manner at the corners while avoiding welded, soldered, or adhesive connections, and which can be fabricated efficiently.

Briefly, the side walls are formed with bent-over edge portions which extend perpendicularly to the bottom or rear wall, as the case may be, and at an angle with respect to the side walls. Connecting elements, preferably in the form of elongated rails, are provided, the rails having outer portions facing the outside of the structure, and an inner portion facing the inside of the structure. The rails are formed with two receiving grooves shaped and dimensioned to receive the edge portions of the side walls, and to form the corners of the furniture structure. The side walls, at the edges thereof parallel to the bottom, or rear, wall, as the case may be, are deformed into a U-shape to define U-channels facing the bottom or rear wall, as the case may be, the end portions of the U-channels of adjacent side walls being located in abutting, or almost abutting, position to form a neat, or abutting, seam.

In accordance with a feature of the invention, the edge portions of the side walls are other than flat, e.g., rounded at the ends, of semi-circular cross section, for example, or are stepped; the receiving grooves are likewise shaped and dimensioned, so that the edge portions are locked in the grooves. The corner elements may be one-piece units, with the end portions of the side walls received therein; or they may be two-piece units, screwed or otherwise connected together, in which one half receives the inside and one half receives the outside of the edge portions of the side walls.

The arrangement has the advantage that painting or enameling, or in the case of aluminum sheets the electrolytic oxidation or anodizing of the sheet, can be performed before the sheets are joined; with welded connections, this is not possible. This results in substantial space saving in storage. Subsequent finishing operations can also be dispensed with.

DRAWINGS

DETAILED DESCRIPTION

Figure 1:
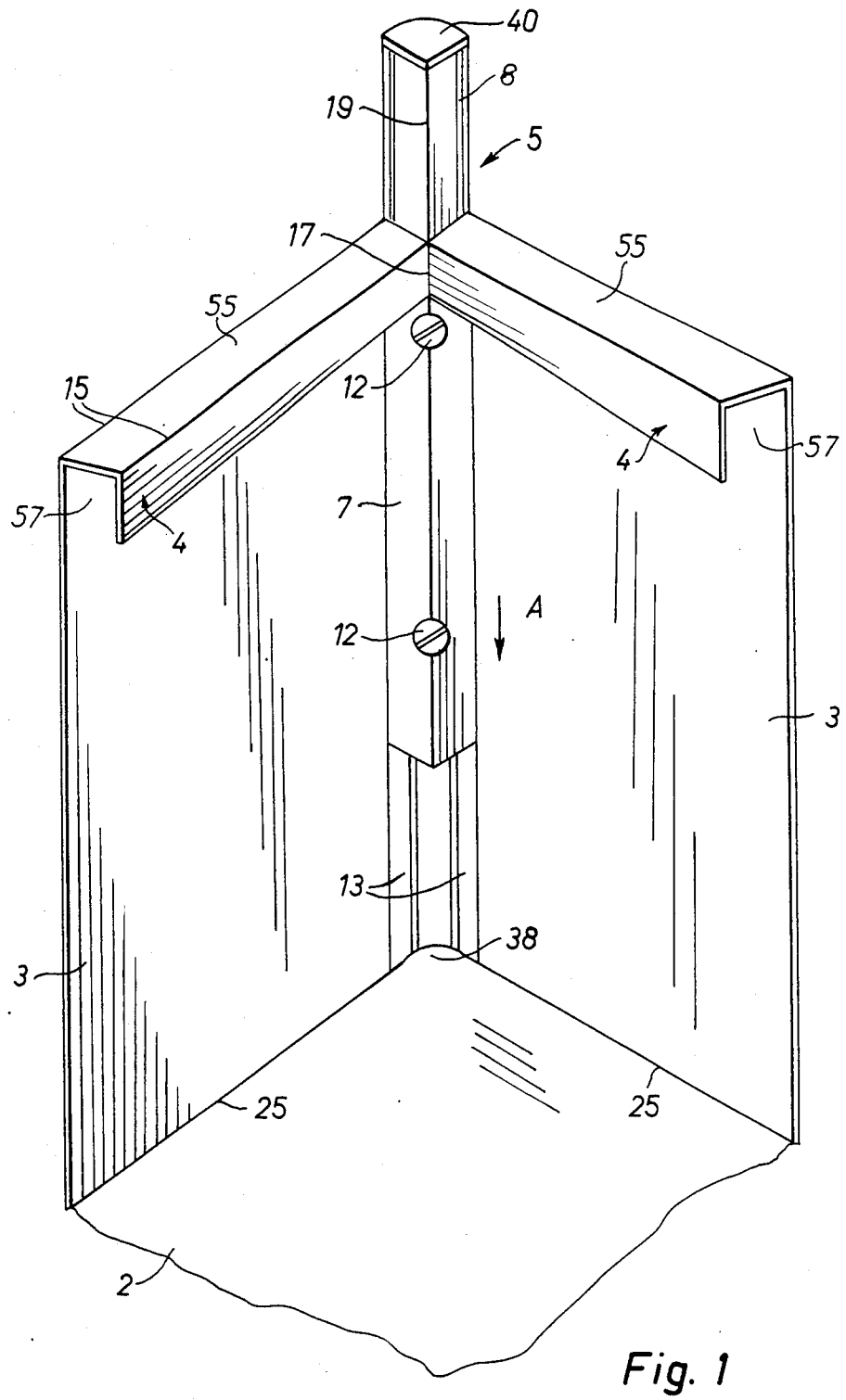
FIG. 1 is a perspective view of a corner area of a box-like structure.

The box-like structure shown in FIG. 1 includes four side walls 3, extending at right angles to one another, and one bottom, or, if mounted sideways, the rear wall, 2. The box is provided with a door later in the usual manner.

The invention will be explained with reference to a bathroom or powder room cabinet. The side walls 3 are held together at the corners by four corner connecting elements or rails 5 in the manner described below.

Figure 2:
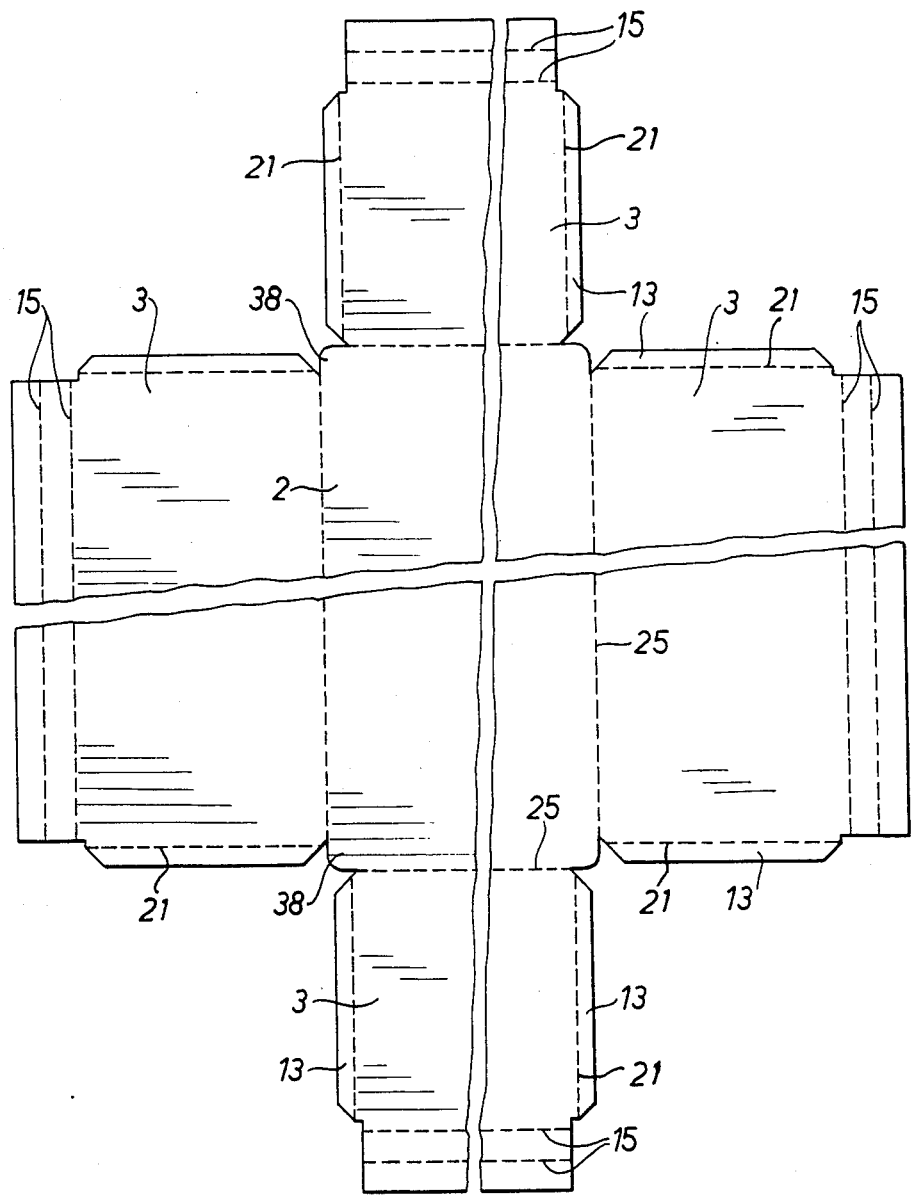
FIG. 2 is a plan view on a single blank or pattern of sheet material, from which the side walls and bottom or rear wall are formed.
Figure 3:
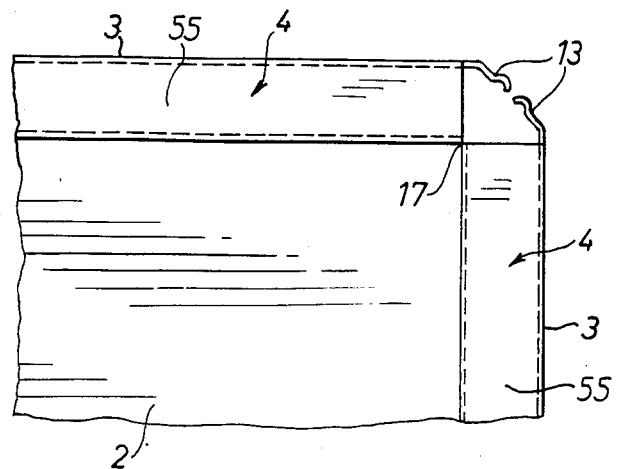
FIG. 3 is a plan view on a corner connection before the connecting rails are inserted.

As shown in FIG. 2, the blank or pattern comprises a single piece of sheet material, from which the box is formed by means of bending operations. The ends of the side walls 3 remote from the bottom, or rear, wall 2 are bent over toward the inside in the shape of a U, as shown in FIG. 1; the bending edges 15 are indicated by dashed lines in FIG. 2. As a result, a channel 57 that is open toward the inside of the box is formed. The U-shaped end portions 4 forming the channel meet at the corners with their inner edges along a line of separation 17, or else are spaced apart from one another by only a slight distance. Lateral, bent side portions, forming holding flaps 13, are located along each of the parallel edges of the side walls 3 extending at right angles to the bottom or rear wall 2. These holding flaps 13 are intended to engage longitudinal grooves 8 of corner connecting rails 5. The base or rear wall 2 will have corner portions 38. The side walls are smooth flat panels of sheet material. Along the edges thereof, the panels are formed with strip-like zones or edge portions 13 offset from or deformed from the panels.

Figure 4:
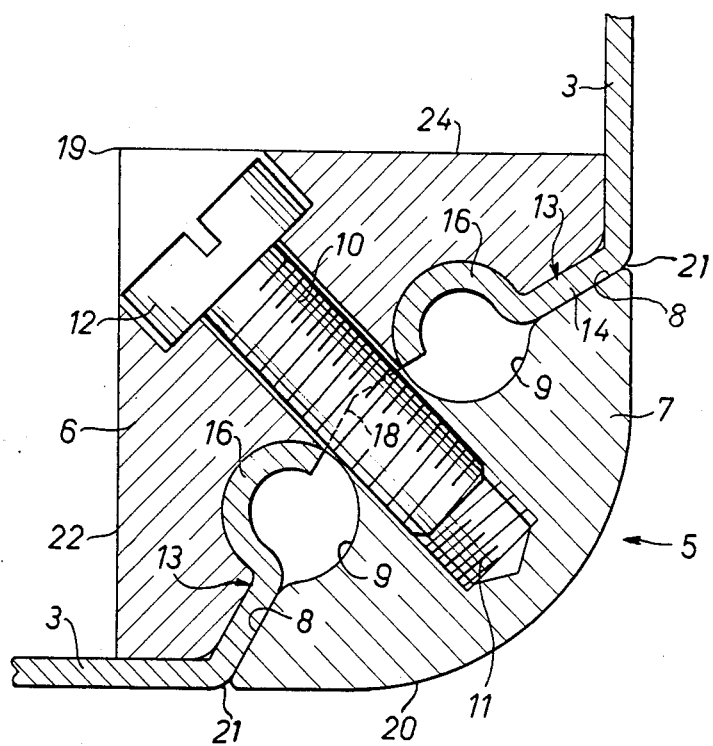
FIG. 4 is a section taken through the corner connection, together with a two-piece connecting rail.

Before the side walls 3 are erected, the holder flaps are shaped from the flat material making up the side walls. After the U-shaped end portions 4 are made from the flat blank of sheet material, the side walls 3 are erected along bending edges 25, thereby producing a box-like shape having four corners, one of these corners being shown in FIG. 1. As shown in FIG. 4, the bent-over, elongated or strip-like edge portions 13 may additionally have a rounded portion 16 of approximately semi-circular cross section provided in their end portions by pressing them into that shape.

Figure 5:
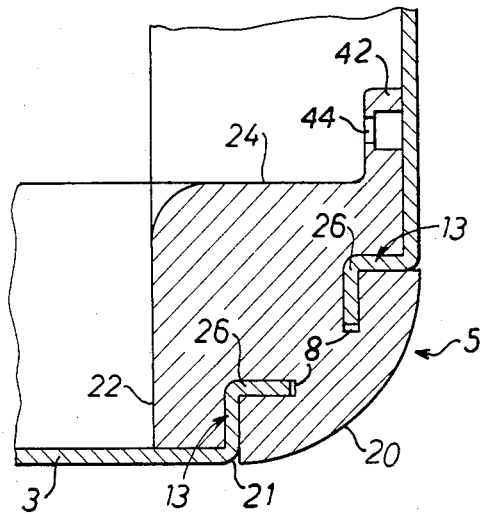
FIG. 5 is a cross section through a variant embodiment of the corner connection.

In the form of embodiment shown in FIG. 5, the edge portion 13 is bent over a second time at a right angle at the corner 26, producing a holder flap having a Z-shaped cross section. The longitudinal grooves 8 in the corner connecting rails 5 are correspondingly angular in embodiment, with one part extending parallel to the face 22 and the other part extending parallel to the face 24, or to the associated side wall 3. The ends of the edge portions 13 engaging the grooves 8 form a 90° angle.

Figure 6:
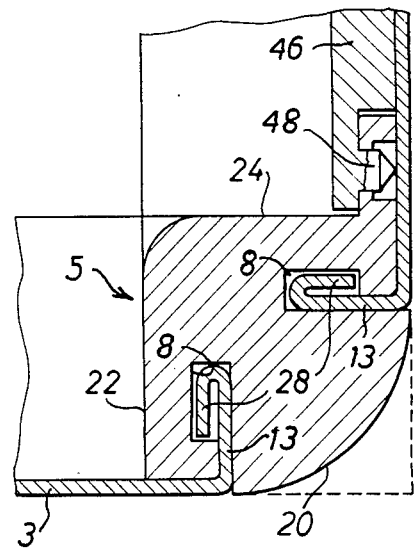
FIG. 6 shows a further variant embodiment of the corner connection.

A further variant embodiment is shown in FIG. 6. Here, the ends of the holder flaps 13 are crimped or bent back on themselves, so that in this crimped area 28 twice the thickness of the sheet material is available. The longitudinal grooves 8 are undercut. The angle between the two holder flaps 13 is 90°; however, it may also be somewhat larger or smaller than 90°.

The edge portions 13 are joined together in a positionally secure manner by one corner connecting rail 5 per corner, the connecting rail 5 being insertable in the direction of the arrow A (FIG. 1), that is, from the direction of the U-shaped end region, and these corner connecting rails 5 extend over the entire depth of the side walls 3.

The connecting rail 5 shown in FIG. 4 comprises two pieces 6 and 7, which are separated from one another in the longitudinal direction of the rail along a line of separation 18 extending through the two longitudinal grooves 8. The longitudinal grooves 8 here each have the cross-sectional shape of a circular bore 9 which extends in the longitudinal direction of the rail. The two parts 6 and 7 of the corner connecting rail 5 are joined to one another by a plurality of screws 10, 12, which are disposed spaced apart from one another in the longitudinal direction of the rail. The head 12 of the screw rests against the piece 6 toward the interior of the box, while the thread engages the piece 7 toward the outside of the box; thus a clamping effect can be exerted upon the edge portions 13 by tightening the screws. The faces 22, 24 of the corner connecting rail 5 oriented toward the interior of the box form a right angle with one another, while the face 20 located on the outside of the box is embodied as a one-quarter-circle curve; the corners or the box are thus rounded. The outer surface of the inner piece 6, adjacent the side wall 3 is recessed with respect to the outer surface 20 of outer piece 7, so that the outer surface of the side wall 3 can be fitted to be flush with the face 20 of the outer piece 7.

In the forms of embodiment shown in FIGS. 5 and 6, the corner connecting rail 5 is a one-piece unit.

The outside of the connecting rail 5 does not necessarily have to be rounded, however; instead, it could also be angular, as indicated by dashed lines in FIG. 6.

The connecting rails 5 can be fabricated from metal, in particular light metal, or they may be made of plastic.

In order to be able to insert shelves in such box-like structures, which are for instance used as bathroom cabinets, it is possible to provide steps or holder elements on the inside of the connecting rails 5, upon which either fastening devices or the shelves themselves can be placed. Furthermore, the connecting rails 5 according to FIGS. 5 and 6 can be provided with a lateral extension 42, in which bores 44 are located spaced apart from one another; holders 46, shelves, or the like can then engage these bores 44 with protrusions 48 (FIG. 6).

A further variant embodiment is shown in FIG. , which the corner connecting rail 5 comprises tw pieces 6, 7 separatable from one another in the longitudinal direction. The side walls 3 and the bottom, or rear, wall 2 can be made from separate sheet-material blanks in this embodiment. The edge portions 13, which serve to engage the corner connecting rail 5, each include a first flap part 35, bent at an angle α of from 30° to 50°, preferably approximately 45°, and an adjoining second flap part 37, extending approximately parallel to the associated side wall 3. On the outer part 7 of the corner connecting rail 5, a sharp corner 23 is formed at each beginning of the groove 8, such that the side wall 3 is flush with the rounded portion 20. Accordingly, there is a practically smooth transition on the outside between the side walls 3 and the corner connecting rails 5.

Figure 8:
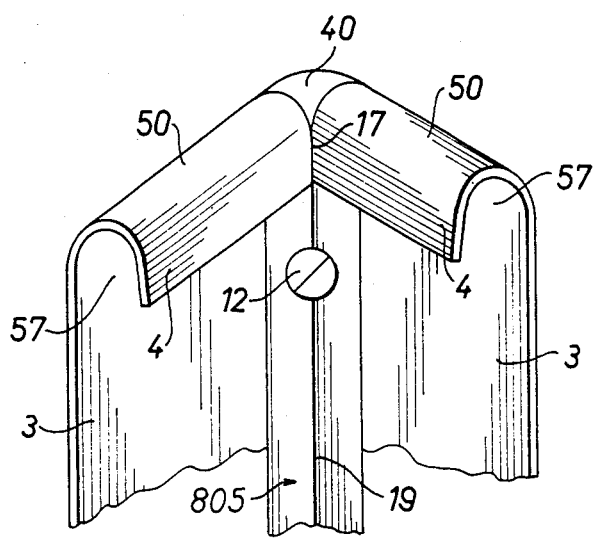
FIG. 8 is a perspective fragmentary view of a corner connection, with a rounded upper edge area.

As shown in FIG. 8, the end portion is provided with an approximately semi-circular rounded portion 50, forming a respective channel 57 at either side of the corner which is open toward the bottom. The edges of this channel toward the inside of the box abut at the corner, forming a vertical line of separation 17. The head element 40 which is rigidly joined to the outer rail piece 7 is rounded on two sides, so that a smooth transition is attained between the rounded portions 50, and the grooves 8 are not visible from the outside. The two-part corner connecting rail 805 is held together by screws 12. It is preferably made of metal, in particular aluminum.

Figure 7:
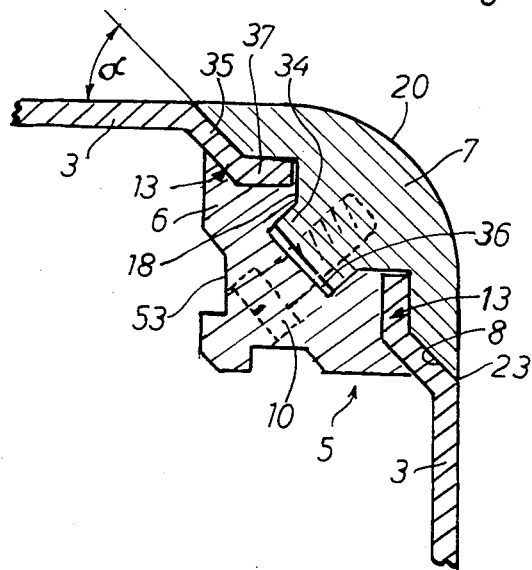
FIG. 7 is a cross section taken through a two-piece corner connecting rail together with side walls that have been inserted into place.
Figure 9:
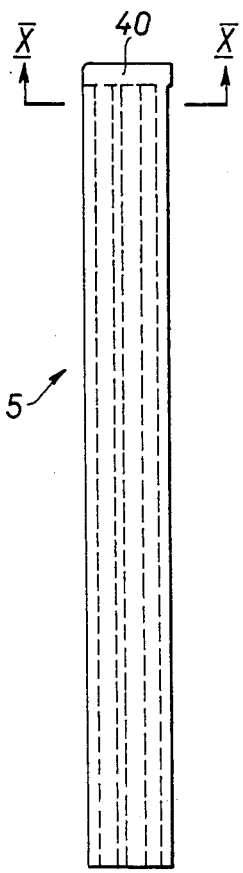
FIG. 9 is a view of a corner connecting rail comprising a single piece.
Figure 10:
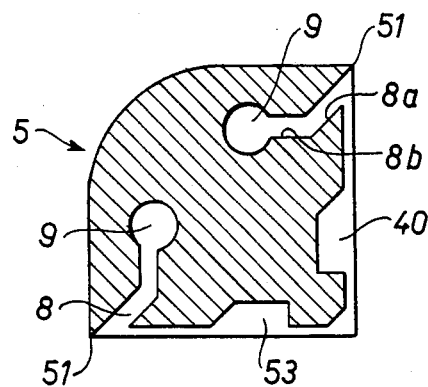
FIG. 10 is a section taken along the line X—X of FIG. 9.

In FIGS. 9 and 10, a one-piece corner connecting rail 5 is shown, which with the head element 40 forms a single one-piece unit and is preferably made of plastic. The grooves 8 each terminate in a longitudinal bore 9 and on the outside they terminate at a corner 51. The angle formed by the two bent-over groove parts 8a, 8b amounts to from 40° to 50°, preferably approximately 45°. As shown in FIGS. 1 and 10, the head element 40 has a flat surface on the outside, if the channel 57 is angular in embodiment—that is, as shown in FIG. 1—and it covers the grooves 8 so that they are not visible from the front of the box. This head element 40 takes the form of approximately one-quarter of a circle, so that once again a smooth, uninterrupted transition with the outer wall 55 of the channel is formed. The grooves 53 serve as needed to receive supports for shelves or the like. Screws 10 (FIG. 4) which hold two elements of the corner rails together are preferably recessed, as shown in FIG. 4, along longitudinally staggered holes inset from the corner edge 19 of the inner element 6. A simple manner of forming the edge portions 13, as shown in FIG. 4, is to first deflect the edge portions 13 inwardly along a straight portion 14 and forming the approximately semicircular, rounded portion 16 at the terminal part thereof. The outer corner 21 of the edge portion 13 preferably is rounded. The rail element 7 (FIG. 7) preferably has an inwardly extending projecting ridge 34, to provide for interfitting, interlocking engagement with its mating element 6. The head element 40 can be secured to the outer piece 7 of the associated connecting element 5.

I claim:

1. Box-like furniture structure, particularly wardrobe or cabinet, having
   an end wall (2);
   four side walls (3) extending perpendicularly to the end wall to define a structure having an open side; and corner connecting elements (5) for connecting together adjacent side walls in right-angle position, wherein
the side walls (3) are formed with
unitary longitudinal edge portions (13) extending perpendicularly to the end wall and at an angle in relation to the respective side wall,
wherein the side walls comprise U-shaped channels (57) located at the open side of the side walls, extending parallel to the end wall and remote therefrom,
said U-shaped channels being defined by an essentially flat connecting portion (55), edges delimiting the connecting portion, an end region of the respective side wall, and an inner portion (4), said inner portion extending essentially in a direction toward the end wall, the inner portions (4) of the U-channels of adjacent side walls being located adjacent each other and forming a corner;
the connecting elements (5) comprise
elongated rail elements having an outer portion facing the outside of the structure and an inner portion inside the structure;
the connecting elements being formed with two receiving grooves (8) and extending in longitudinal direction of the respective connecting element, each groove being shaped and dimensioned to receive and fit therein the edge portions (13) of the side walls (3) and forming the corners of the furniture structure,
the inner portion having an outer surface region, located adjacent the outer portion, which is recessed with respect to the outer surface (20) of the outer portion;
wherein a head element (40) is provided above each connecting element (5) covering the receiving grooves (8),
said head element having, in cross section perpendicular to the side wall, approximately quarter-circle shape, and positioned for covering the receiving grooves (8) at said top portion of the connecting element, and located adjacent an end portion of the connecting element,
and wherein the outer surfaces (20) of the corner connecting elements (5) are flush with the side walls adjacent said connecting elements.

2. Box-like furniture structure according to claim 1, wherein the receiving grooves (8) of the connecting elements (5) are formed with a guide portion and with a locking portion (9) which is larger than the guide portion to receive a respective edge portion of the side walls shaped and dimensioned to fit into said larged locking portion (9).

3. Box-like furniture structure according to claim 1, wherein
the edge portions (13) of the side walls have end regions, which end regions are bent back on themselves;
and the two receiving grooves (8) of the connecting elements (5) have inner ends, said inner ends form an angle of at least 90° with one another, and have a width about twice the thickness of the sheet material of the end regions to receive said bent-back end regions.

4. Box-like furniture structure according to claim 1, wherein each of the two receiving grooves (8) is angular in cross section, and the edge portions (13) of the side walls have a Z-shaped cross section.

5. Box-like furniture structure according to claim 1, wherein at least one corner connecting element (5) is formed as an elongated part, and said elongated part and the head element (40) are formed as a one-piece unit.

6. Box-like furniture structure according to claim 1, wherein
the corner connecting elements (5) are formed as two elongated pieces extending in longitudinal direction along the side walls, the line of separation (18) extending through both receiving grooves (8);
fastening means (10, 12) are provided for connecting together the two elongated pieces (6, 7); and
wherein the two pieces (6, 7) of the corner connecting elements (5) are formed with interengaging projection and recess means.

7. Box-like furniture structure according to claim 1, wherein the side walls (3) and the end wall (2) comprise a single piece of sheet material.

8. Box-like furniture structure according to claim 1, wherein the corner connecting elements (5) include an elongated part, and said elongated part and the head elements (40) are formed as one-piece plastic units.

9. Box-like furniture structure according to claim 1, wherein
the side walls are structural elements of smooth sheet material, and comprise essentially smooth, flat panels, and the edge regions of the side walls comprise longitudinal smooth strip zones of said sheet material which define surfaces deformed from, or offset with respect to said panels; and
the receiving grooves, each, are dimensioned and located to receive said deformed or offset strip zones, and retain the strip zones in position to place the adjacent side walls in said right-angle position.

10. Box-like furniture structure, particularly wardrobe or cabinet, having
an end wall (2);
four side walls (3) extending perpendicularly to the end wall to define a structure having an open side; and corner connecting elements (5) for connecting together adjacent side walls in right-angle position, wherein
the side walls (3) are formed with
unitary longitudinal edge portions (13) extending perpendicularly to the end wall and at an angle in relation to the respective side wall,
wherein the side walls comprise U-shaped channels (57) located at the open side of the side walls, extending parallel to the end wall and remote therefrom,
said U-shaped channels being defined by a rounded connecting portion (50), an end region of the respective side wall, and an inner portion (4), said inner portion extending essentially in a direction toward the end wall, the inner portions (4) of the U-channel of adjacent side walls being located adjacent each other and forming a corner;
the connecting elements (5) comprise
elongated rail elements having an outer portion facing the outside of the structure and an inner portion inside the structure;
the connecting elements being formed with two receiving grooves (8) and extending in longitudinal direction of the respective connecting element, each groove being shaped and dimensioned to receive and fit therein the edge portions (13) of the side walls (3) and forming the corners of the furniture structure, the inner portion having an outer surface region, located adjacent the outer portion, which is recessed with respect to the outer surface (20) of the outer portion;
wherein a head element (40) is provided above each connecting element (5) covering the receiving grooves (8),
said head element having, in cross section perpendicular to the side wall, approximately quarter-circle shape, and positioned for covering the receiving grooves (8) at said top portion of the connecting element, and located adjcent an end portion of the connecting element,
wherein the outer surfaces (20) of the corner connecting elements (15) are flush with the side walls adjacent said connecting elements,
and wherein, between the side walls (3) and the outside of the corner connecting element (5), the transition is smooth, to form said flush surface.

11. Box-like furniture structure according to claim 10, wherein the side walls (3) and the end wall (2) comprise a single piece of sheet material.

12. Box-like furniture structure according to claim 10, wherein the side walls are essentially flat panels and the edge portions are bent at an angle of approximately 45° with respect to the flat panels.

13. Box-like furniture structure according to claim 10, wherein
the corner connecting elements (5) are formed as two elongated parts extending in longitudinal direction along the side walls, the line of separation (18) extending through both receiving grooves (8);
fastening means (10, 12) are provided for connecting together the two parts (6, 7); and
wherein the two parts (6, 7) of the corner connecting elements (5) are respectively formed with interengaging projection and recess means.

14. Box-like furniture structure according to claim 10, wherein
the corner connecting elements (5) are formed as two parts defining an inner part (6) and an outer part (7) extending in longitudinal direction along the side walls, the line of separation (18) extending through the receiving grooves (8);
and connection means (10) are provided, connecting the two parts.

15. Box-like furniture structure according to claim 14, wherein the head element (40) is secured to the outer part.

16. Box-like furniture structure according to claim 10, wherein
the outer surface (20) of the connecting element 5 is rounded, and
the head element has a rounded surface matching the shape of the outer surface of the U-channel and is flush therewith, to provide for flush connection of the side walls with rounded corners throughout the structure.

17. Corner connecting element for connecting two side walls of a box-like furniture structure or the like, comprising
two elongated, contiguous parts, separated in longitudinal direction by a line of separation, said line of separation separating said parts into an outer part and an inner part;
longitudinal grooves (8) formed along said line of separation, the outer part of the connecting element being formed with an outer limiting surface (20) in the form of a one-quarter circle;
means for connecting the two parts (6, 7) of the connecting element;
and a head element (40) secured to an end surface at one end of said parts of the corner connecting element and having, externally, a rounded surface;
said head element being positioned to cover said grooves;
wherein said grooves are each formed in two adjoining portions and one portion has an angle of between 30° and 50° with respect to another portion;
the two parts (6, 7) are formed with interengaging projection-and-recess means (34, 36);
and wherein the inner part has an outer surface adjacent the outer part which is recessed with respect to the outer surface of the outer part.

18. Corner connecting element according to claim 17, wherein the head element (40) is secured to the outer part (7) of the two parts forming the connecting element.

19. Corner connecting element according to claim 17, wherein said angle is about 45°.

20. Box-like furniture structure according to claim 10, wherein
the side walls are structural elements of smooth sheet material, and comprise essentially smooth, flat panels, and the edge regions of the side walls comprise longitudinal smooth strip zones of said sheet material which define surfaces deformed from, or offset with respect to said panels; and
the receiving grooves, each, are dimensioned and located to receive said deformed or offset strip zones, and retain the strip zones in position to place the adjacent side walls in said right-angle position.

* * * * *